United States Patent [19]

Nagao

[11] Patent Number: 5,020,618

[45] Date of Patent: Jun. 4, 1991

[54] FULL HYDRAULIC POWER STEERING APPARATUS

[75] Inventor: Makoto Nagao, Kameoka, Japan

[73] Assignee: Eaton Corporation, Cleveland, Ohio

[21] Appl. No.: 537,403

[22] Filed: Jun. 13, 1990

[30] Foreign Application Priority Data

Jul. 12, 1989 [JP] Japan .................................. 1-177957

[51] Int. Cl.⁵ ............................................. B62D 5/06
[52] U.S. Cl. ...................................... 180/132; 60/384;
91/467; 180/142
[58] Field of Search ........................... 60/384; 91/467;
180/132, 142

[56] References Cited

U.S. PATENT DOCUMENTS 4,703,819 11/1987 Hosotani .............................. 180/132
4,759,182 7/1988 Haarstad .......................... 180/132 X

FOREIGN PATENT DOCUMENTS 0195064 8/1988 Japan .................................. 180/132

Primary Examiner—Mitchell J. Hill
Assistant Examiner—Paul Dickson
Attorney, Agent, or Firm—L. J. Kasper

[57] ABSTRACT

A full hydraulic power steering apparatus is provided of the type including a steering unit (2) and a steering cylinder (5). Pressurized fluid is supplied to the steering unit (2) from a pump (6) and compensating valve (10) through a pressure line (8). Conduits (103, 104) communicate from the pressure line (8) to a pair of amplification ports (38, 39) through a pair of open-close valves (105, 106) and check valves (108, 109). A pair of detection members (101, 102) sense the positions of the input handle (1) and the steering cylinder (5), and a controller (100) generates electrical input signals to control operation of the valves (105, 106) to correct any short or over condition of the cylinder (5) relative to its target position as determined by the position of the input handle (1).

15 Claims, 9 Drawing Sheets

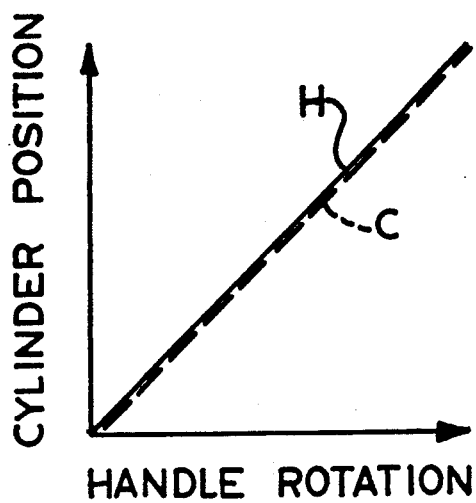
FIG. (9A)
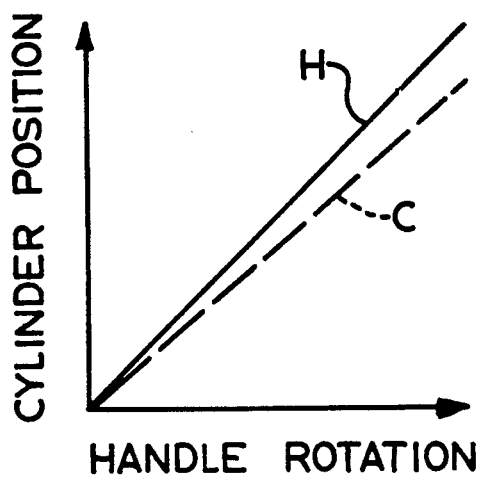
FIG. (9B)
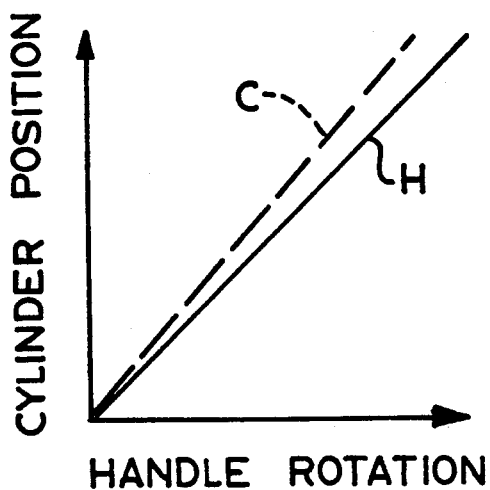
FIG. (9C)

FULL HYDRAULIC POWER STEERING APPARATUS

BACKGROUND OF THE DISCLOSURE

This application claims priority, under 35 U.S.C. 119, of earlier-filed Japanese application Hei 1-177957, filed July 12, 1989.

The present invention relates to a full hydraulic power steering apparatus for a vehicle, especially an off-highway vehicle such as a tractor or construction vehicle.

The kind of conventional apparatus to be described with reference to an embodiment of the present invention is constructed as follows. The conventional apparatus is provided with a steering unit having a directional control valve operated by a handle, such as the vehicle steering wheel. A steering cylinder is connected with the steering unit through first hydraulic pressure lines comprising a pair of left and right lines, and steers a steered wheel. A pump of a hydraulic power source supplies hydraulic pressure to the steering unit through a second hydraulic pressure line.

In such full hydraulic power steering apparatus, because the handle and steered wheels are not mechanically, but hydraulically, connected, and in spite of the fact that the handle is put in a neutral position, the steering cylinder is frequently displaced from the neutral position due to leakage of hydraulic fluid at the steering unit and steering cylinder, whereby the vehicle may travel zigzag. The applicant of the present invention has proposed the system shown in the Japanese Patent Application No. Sho 63- 321,430, in which a power steering apparatus is disclosed which solves the problem created in the aforesaid power steering apparatus and which can easily amend the actual position of the cylinder with respect to the target position, as set by the position of the handle, without the operator shifting the steering wheel position.

Such power steering apparatus can amend the displacement state with ease without shifting the target position of the cylinder with respect to the handle position. However, when manual steering operation is intended to be carried out during the non-operation of a pump, the problem is created in that there is a fear that discharged oil is not supplied to the steering cylinder, but reversely flows.

SUMMARY OF THE INVENTION

An object of the invention is to provide a power steering apparatus which solves the problem in the conventionally proposed power steering apparatus and maintains the advantage of the power steering apparatus, so that, even when manually steered, it can prevent the discharged oil from reversely flowing.

The proposed apparatus is so constructed that the conventional steering apparatus is provided with third and fourth hydraulic pressure lines communicating a second hydraulic pressure line with the steering unit and having first and second auxiliary open-close valves, respectively. First and second detecting members are included for outputting signals corresponding to displacement of the handle and steering cylinder from the neutral positions thereof. A controller which is given signals from the detecting members operates the auxiliary open-close valves.

In accordance with a more limited aspect of the present invention, the third and fourth hydraulic pressure lines are provided with check valves, to prevent reverse fluid flow in the third and fourth hydraulic pressure lines.

BRIEF DESCRIPTION OF THE DRAWINGS

FIGS. 9-(A), -(B) and -(C) are graphs showing the relations with respect to the target set value between the rotation of the handle and the stroke of the cylinder in FIGS. 6, 7 and 8, respectively.

DESCRIPTION OF THE PREFERRED EMBODIMENT

Figure 1:
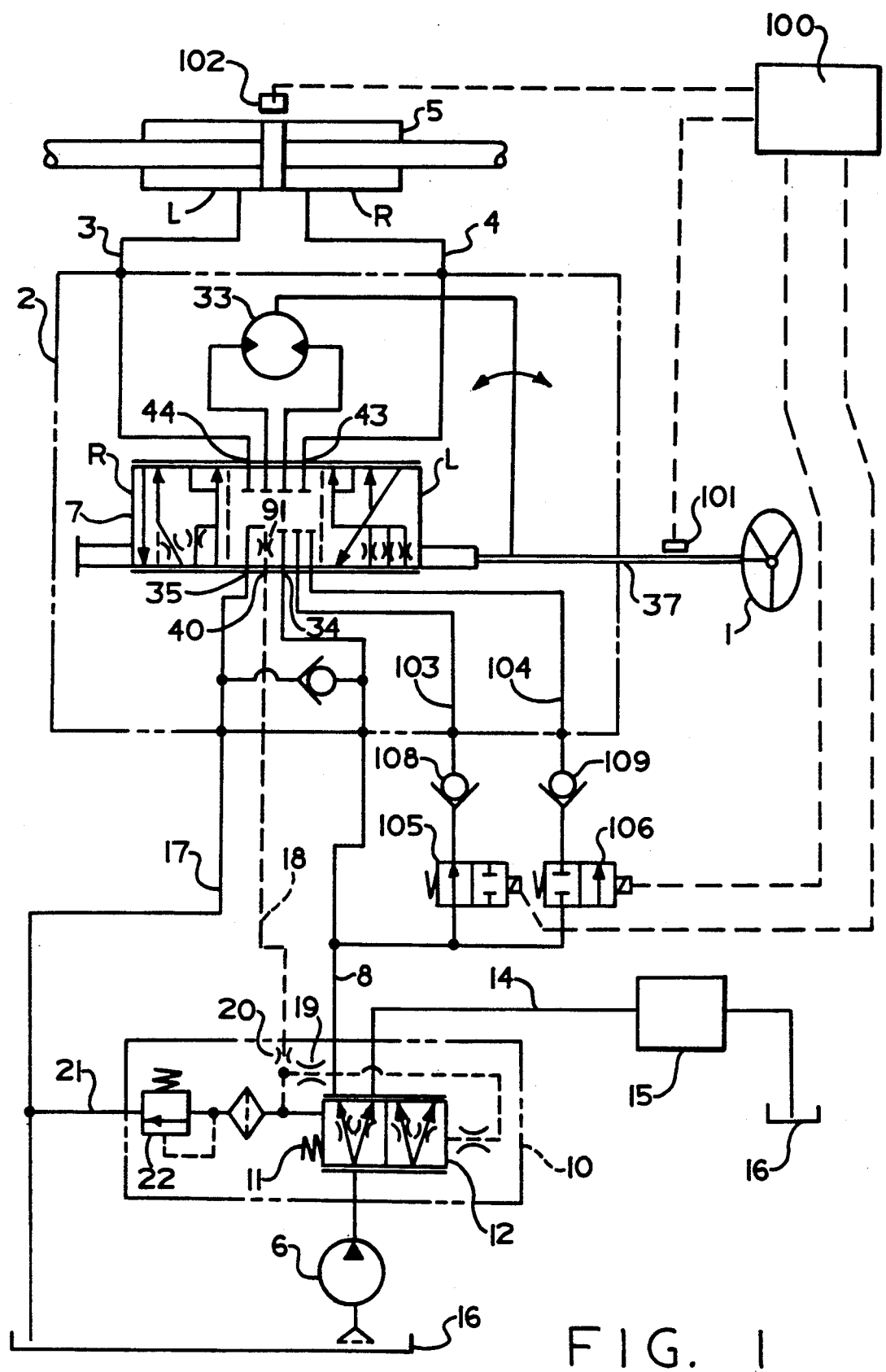
FIG. 1 is a hydraulic circuit diagram of an embodiment of the invention when in the neutral condition.

Referring now to the drawings, which are not intended to limit the present invention, FIG. 1 illustrates a system including a steering unit 2 having a directional control valve 7 operated by a handle 1. A steering cylinder 5 is connected the steering unit 2 through first hydraulic pressure lines 3 and 4 comprising a pair of left and right lines, and the cylinder 5 steers a steered wheel (or typically, a pair of steered wheels, not shown herein). A pump 6 comprises part of a hydraulic power source for supplying hydraulic pressure to the steering unit 2 through a second hydraulic pressure line 8.

Reference numeral 10 designates a flow rate compensating valve, a valve body 12 being biased in one direction by a spring 11 which is provided in a casing. Oil flows into the valve 10 from a pump 6 and is fed, on the one hand, into a steering unit 2 from an inlet port 34 thereof to be discussed below through the second hydraulic pressure line 8, and on the other hand, into an actuator 15 through a separate pipe line 14.

Return oil from the steering cylinder 5 returns to a tank 16 from an outlet port 35, to be discussed below, at the steering unit 2 in the same way as the return oil from the actuator 15.

A pilot port 40, to be discussed below, at the steering unit 2 communicates with both sides of the valve body 12 of the pressure and flow rate compensating valve 10 through a pilot hydraulic pressure line 18, and orifices 19 and 20 are provided in the hydraulic pressure line 18, at the spring 11 side of the valve 10. Hydraulic pressure line 18 is provided with a pipe line 21 communicating with the pipe line 17, and a relief valve 22 is provided in the pipe line 21.

Figure 2:
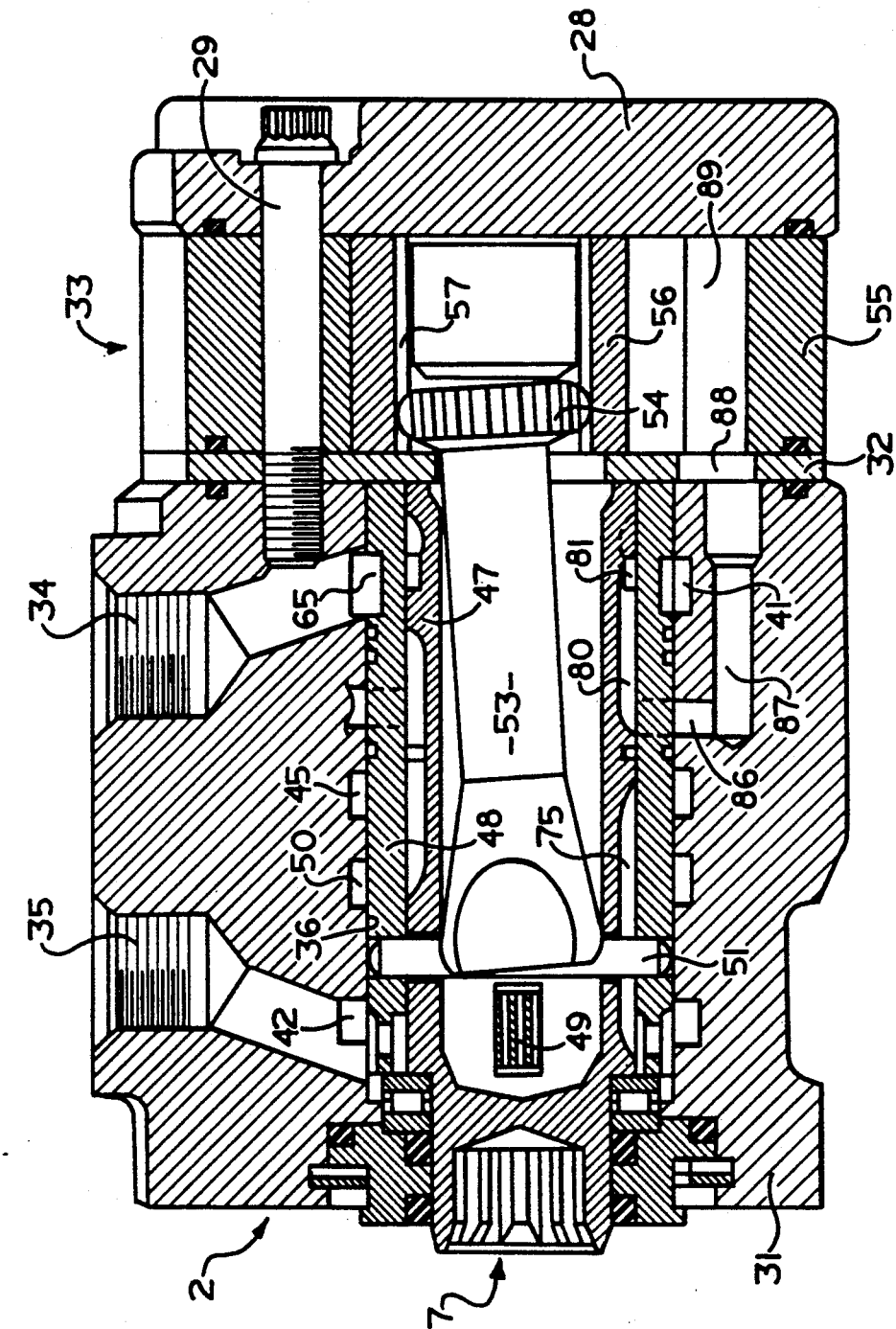
FIG. 2 is a longitudinally sectional view of a typical example of a steering unit of the type shown schematically in FIG. 1.
Figure 3:
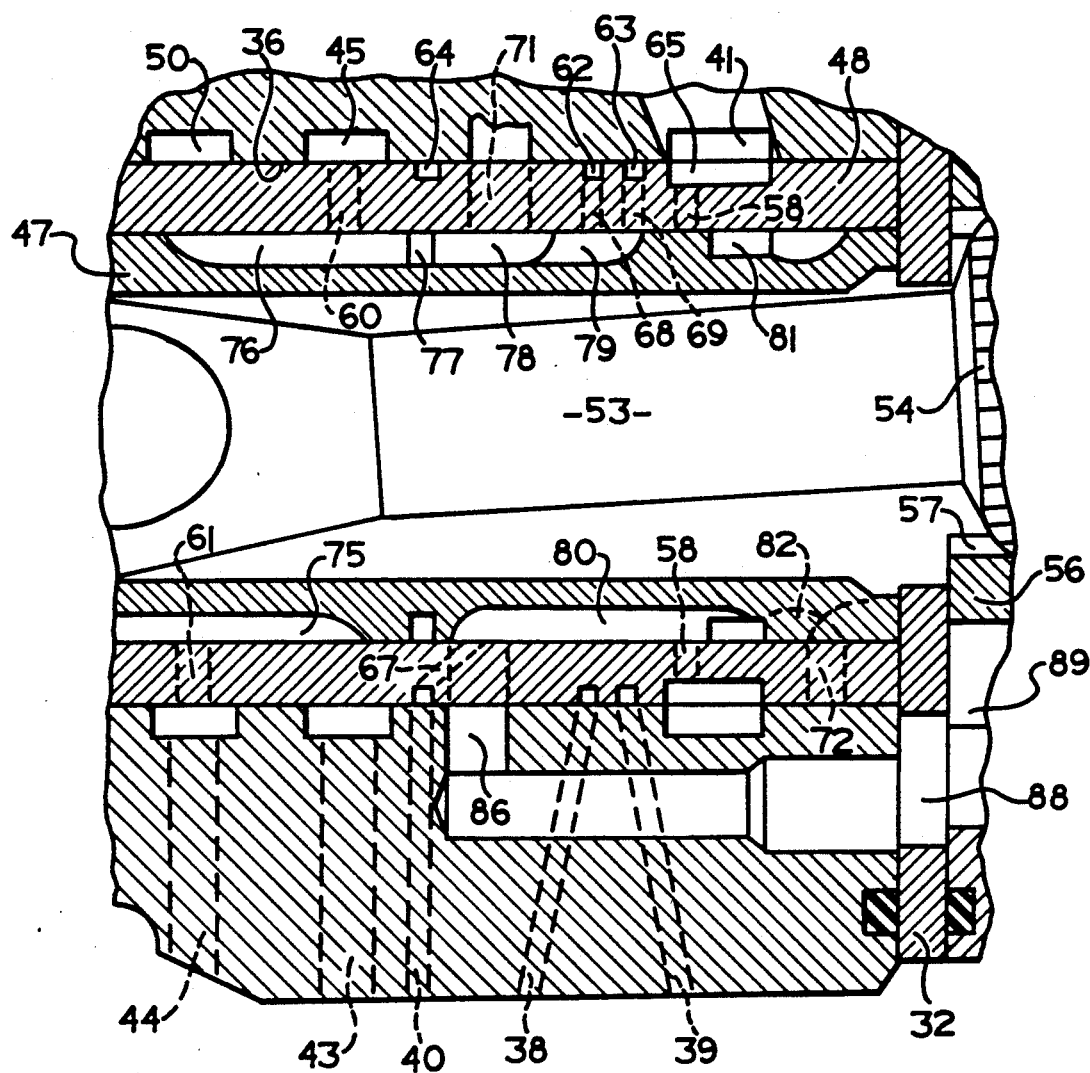
FIG. 3 is a fragmentary, enlarged view of a portion of the steering unit shown in FIG. 2.

In FIGS. 2 and 3, an example of steering unit 2 will be described in detail. Reference numeral 31 designates a housing. At the right end thereof are disposed, in order, a spacer plate 32, an amplified portion 33 (also referred to as a fluid meter), and an end cap 28, which are coupled with the housing 31 through bolts 29.

In the housing 31 are formed an inlet port 34, an outlet port 35, first and second auxiliary inlet ports 38, and 39, a pilot port 40, a right-hand port 43, and a left-hand port 44. At a central bore 36 are formed annular grooves 41, 42, 45 and 50 communicating with the ports 34, 35, 43 and 44 respectively. Also, at the central bore 36 is rotatably disposed a directional control valve 7 provided with a rotatable spool 47 and a relatively rotatable, follow-up sleeve 48 in association therewith. An input shaft 37 of the handle 1 is connected to one end of the spool 47.

A centering spring 49 is fitted at both ends into through-bores provided in the spool 47 and sleeve 48, and 51 designates a stopper pin which circumferentially movably extends at both ends thereof through bores 52 at the spool 47 and thereafter is supported by through-bores at the sleeve 48. 53 designates a driving shaft which transmits rotary motion from the amplified portion (meter) 33 to the sleeve 48. The driving shaft 53 is provided at one axial end with a bifurcated portion through which the stopper pin 51 extends and at the other axial end with a splined head 54. The amplified portion 33 has an internally toothed member 55 and an externally toothed member 56 engageable with the internal teeth of internally toothed member 55, having teeth less by one in number than the internally toothed member 55, and provided eccentrically therein, so as to perform both orbital movement and rotation. Splines 57 are provided at the center bore of the externally toothed member 56 and engage with the splined head of driving shaft 53.

Figure 4:
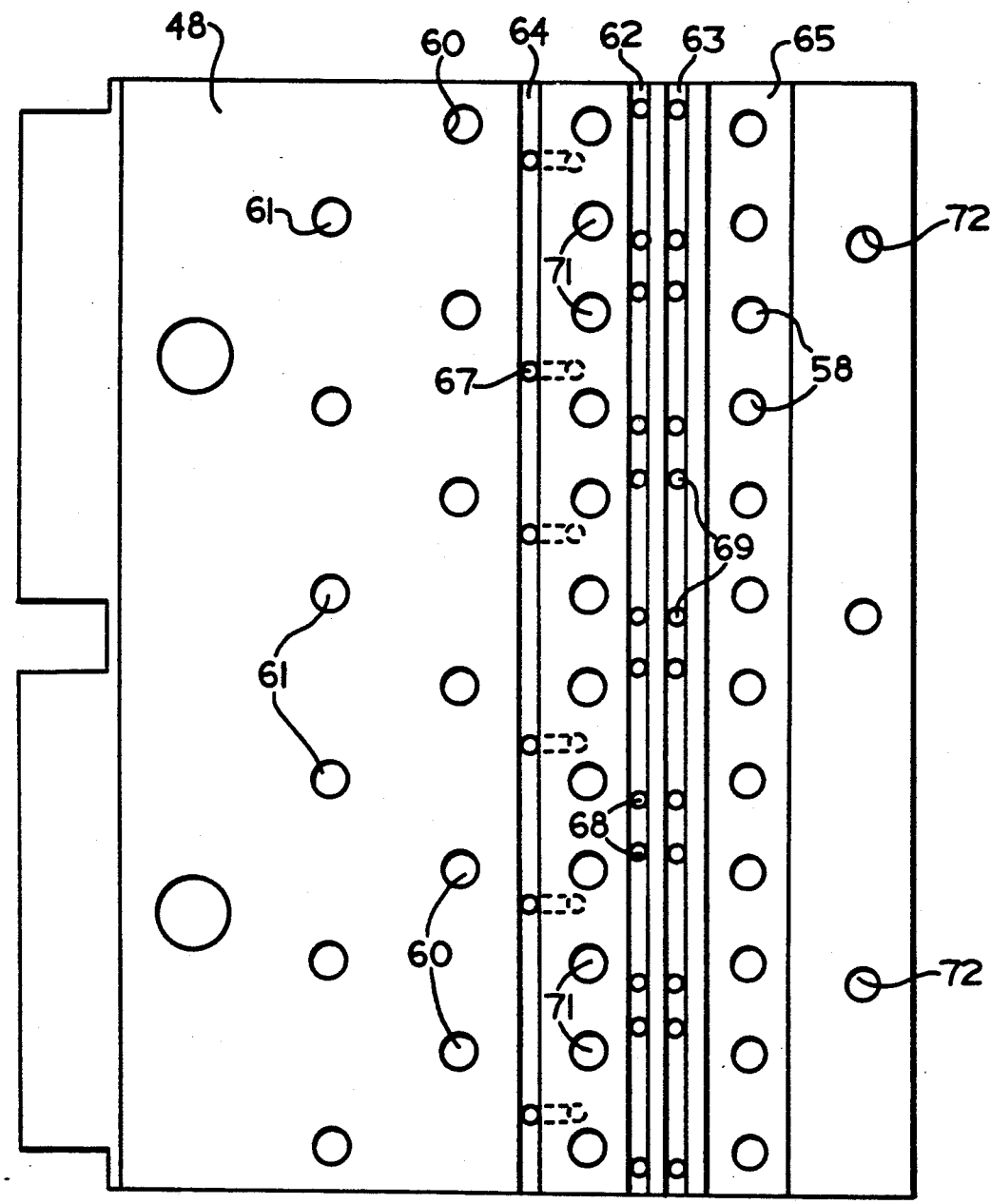
FIG. 4 is a developed view of the surface of the sleeve of the steering unit shown in FIG. 2.

The sleeve 48, as best shown in FIGS. 3 and 4, is provided with an annular groove 65 communicating with the annular groove 41 at the housing 31, through-bores 59, 60 and 61 communicating with the annular grooves 42, 45 and 50 respectively, and annular grooves 62, 63 and 64 communicating with the ports 38, 39 and 40 respectively. Furthermore, the sleeve 48, as shown in FIG. 4, is provided with the through-bores 68, 69 and 58 communicating with the annular grooves 62, 63 and 65 respectively. A slanted through-bore 67 communicates with the annular groove 64, a plurality of radial through-bores 71 is disposed axially between the annular grooves 62 and 64, and a plurality through-bores 72 is disposed rightwardly from the annular groove 65.

Figure 5:
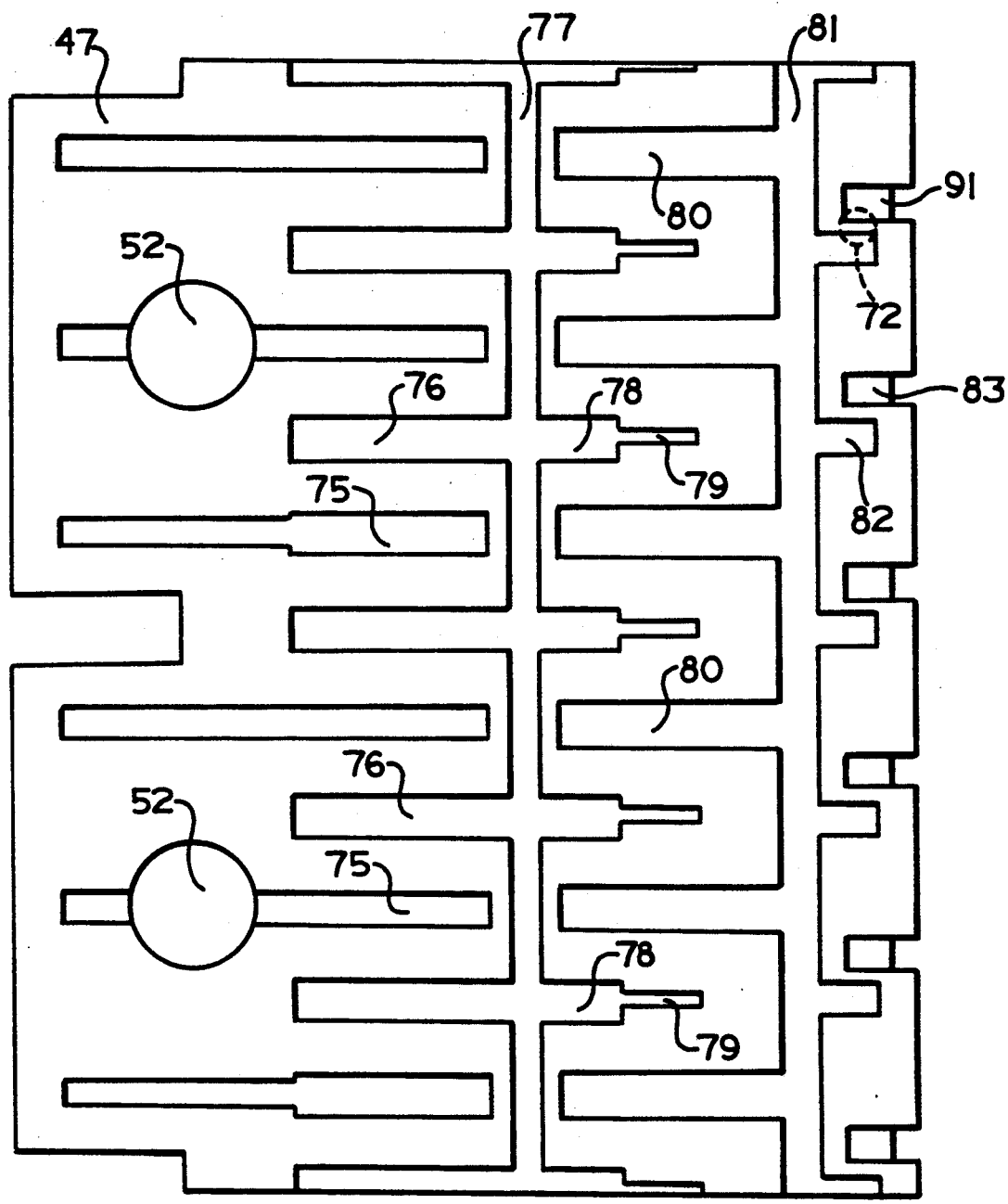
FIG. 5 is a developed view of the surface of the spool of the steering unit shown in FIG. 2.

The spool 47, as shown in FIG. 5, is provided with axial grooves 75 communicating in part with the through bores 52. Axial grooves 76 are disposed alternately with the grooves 75, and an annular groove 77 circumferentially communicates with the grooves 76. An axial groove 78 extends from the annular groove 77 in a direction opposite to that of the grooves 76, a smaller width groove 79 extending from the utmost end of each groove 78 in the same direction as the groove 78 (i.e., to the right in FIG. 5). Axial grooves 80 are disposed alternately with the axial grooves 78, an annular groove 81 circumferentially communicating with the grooves 80, and axial grooves 82 extending from the annular groove 81 in a direction opposite that of the axial grooves 80. An axial groove 83 extends from an intermediate portion of each axial groove 82, to the right in FIG. 5, to the edge of the spool 47.

Referring again to FIGS. 2 and 3, the housing 31 is provided with a radial bore 86 communicating with the through-bore 71 at the sleeve 48, and a bore 87 axially extending from the end of bore 86 to the amplified portion 33, the bore 87 communicating with a through-bore 88 provided in a spacer plate 32, the through-bore 88 communicating with a pressure chamber 89 at the amplified portion 33.

In the aforesaid apparatus, the spool 47 and sleeve 48 rotate relative to each other when actuated, thereby constituting the following orifices at the respective ports, which are described with reference primarily to FIGS. 4 and 5. In detail, a first orifice 91 (shown only in FIG. 1), is formed between the through-bores 72 at the sleeve 48 and the axial grooves 82 and 83 at the spool 47. A second orifice 92 (also referred to as the A1 orifice) is formed between the through-bores 58 at the sleeve 48 and the axial grooves 80 at the spool 47. A third orifice 93 (also referred to as the A2 orifice) is formed between the through-bores 71 at the sleeve 48 and the axial groove 80 at the spool 47. A fourth orifice 94 also referred to as the A3 orifice) is formed between the through-bores 71 at the sleeve 48 and the axial grooves 78 at the spool 47. A fifth orifice 95 (also referred to as the A4 orifice) is formed between the through-bores 60 at the sleeve 48 and the axial grooves 76 at the spool 47. A sixth orifice 96 (also referred to as the A5 orifice) is formed between the through-bores 61 at the sleeve 48 and the axial grooves 75 at the spool 47.

All of the orifices described in the previous paragraph are conventional, and therefore, well known to those skilled in the art. A seventh orifice 97 is formed between the through-bore 68 at the sleeve 48 and the axial groove 79 at the spool 47, and an eighth orifice 98 is formed between the through-bore 69 at the sleeve 48 and the axial groove 79 at the spool 47. A better understanding of the orifices 97 and 98 may be gained by reference to U.S. Pat. No. 4,759,182, assigned to the assignee of the present invention, and incorporated herein by reference.

In addition to the above, the apparatus of the present invention is provided with a controller 100, as shown in FIG. 1, which includes a second detecting member 102, for detecting the linear position of the cylinder 5. First and second auxiliary open-close valves 105 and 106 (which may preferably be solenoid valves) are provided in third and fourth hydraulic pressure lines 103 and 104, for communicating the second hydraulic pressure line 8 with the first and second auxiliary inlet ports 38 and 39, respectively. A first detecting member 101 comprises a rotational angle sensor for the handle 1 and is disposed adjacent the input shaft 37. Check valves 108 and 109 are provided in the third and fourth hydraulic pressure lines 103 and 104, on the downstream sides of the first and second auxiliary open-close valves 105 and 106, respectively.

Operation Of Invention

Next, explanation will be given regarding operation of the above-mentioned apparatus. When the handle 1 is in the neutral position (FIG. 1) oil, which flows into the steering unit 2 from the pressure and flow rate compensating valve 10, flows through the pilot port 40 at the housing 31 and pilot hydraulic pressure line 18, passes through the annular groove 64 and slanted through-bore 67, flows toward the grooves 80, 81 and 82 at the spool 47, then enters into the through-bores 72 at the sleeve 48. This fluid again enters the spool 47 from the axial groove 83 at the spool 48, and flows from the outlet port 35 to the tank 16.

In the situation described above, the flow rate of oil is determined by the orifice 19, and the pressure of the spring 11 at the pressure and flow rate compensating valve 10. The flow rate is reduced by the relation between the orifice 19 and the pressure of the spring 11, resulting in that most of the oil discharged from the pump 6 flows to the actuator 15 through the pipe line 14.

At this time, although the first auxiliary open-close valve 105 is open, the directional control valve 7 is in the neutral position and is blocked in the same way as the conventional one, thereby preventing the oil from flowing through the steering unit 2.

When the handle 1 is operated, the centering spring 49 in the steering unit 2 deflects to cause angular displacement between the sleeve 48 and the spool 47, so that each orifice 92 through 98 begins to open. However, the first orifice 91, which comprises the axial grooves 82 and 83 at the spool 47 and the through-bore 72, and is open when the handle is positioned in the neutral position, begins to close.

Figure 6:
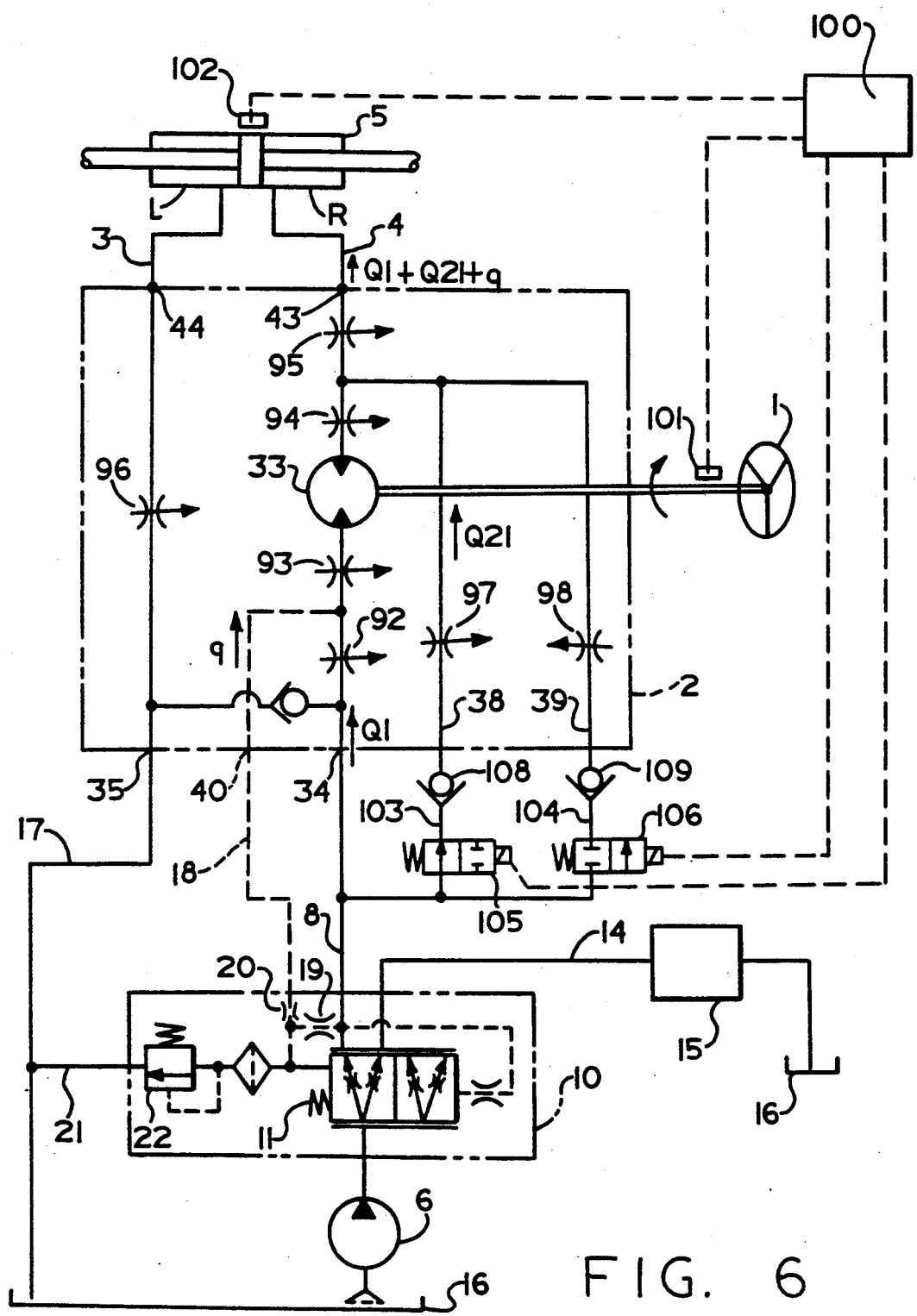
FIG. 6 is a hydraulic circuit diagram of the embodiment during the normal steering operation.

Referring now to FIGS. 6 and 9-(A), oil which flows into the steering unit 2 from the inlet port 34 at the housing 31, through the pressure and flow rate compensating valve 10 and second hydraulic pressure line 8, passes through the annular groove 41 at the housing 31, annular groove 65 at the sleeve 48, second orifice 92 composed of the through-bore 58 at the sleeve 48 and axial groove 80 at the spool 47, and third orifice 93 composed of the through-bore 71 at the sleeve 48 and axial groove 78 at the spool 47. This fluid flows to the bores 86 and 87 at the housing 31, and passes through the through-bore 88 at the spacer plate 32 to rotate the externally toothed member 56 at the amplified portion 33. The portion 33 thereby measures an amount of discharged oil. Thereafter, the oil again passes through the bores 86 at the housing 31, through the fourth orifice 94 composed of the through-bore 71 at the sleeve 48 and groove 78 at the spool 47, the axial groove 78 at the spool 47, the annular groove 77, and the axial groove 76, and flows to the cylinder 5 from the right-hand port 43 through the fifth orifice 95, composed of the through bore 60 at the sleeve 48 and axial groove 76 at the spool 47 and through the annular groove 45 at the housing 31. In this case the flow rate is Q1+q, the same as in the conventional apparatus.

This case is the same as when the handle is in the neutral position, the first auxiliary open-close valve 105 is open, so that oil flowing therein flows to the first auxiliary inlet port 38 at the steering unit 2 through the third hydraulic pressure line 103. The oil flows to the annular groove 62 at the sleeve 48, passes through the seventh orifice 97, composed of the through-bore 68 at the sleeve 48 and axial groove 79 at the spool 47, and flows with the flow rate Q21 to the fifth orifice 95, then to the cylinder 5, in the same way as the aforesaid oil, thereby obtaining the total flow rate Q1+Q21+q into the cylinder 5.

A corresponding amount of rotation of handle 1 to a stroke of cylinder 5 is determined as a target setting value as shown in FIG. 9-(A) and input to the controller 100. Return oil from the cylinder 5 flows into the steering unit 2 through the left-hand port 44 and to the sixth orifice 96, composed of the through-bore 61 at the sleeve 48 and axial groove at the spool 47 from the annular groove 50 at the housing 31, so as to pass through the inside of the spool 47 and return from the external port 35 to the tank 16.

Figure 7:
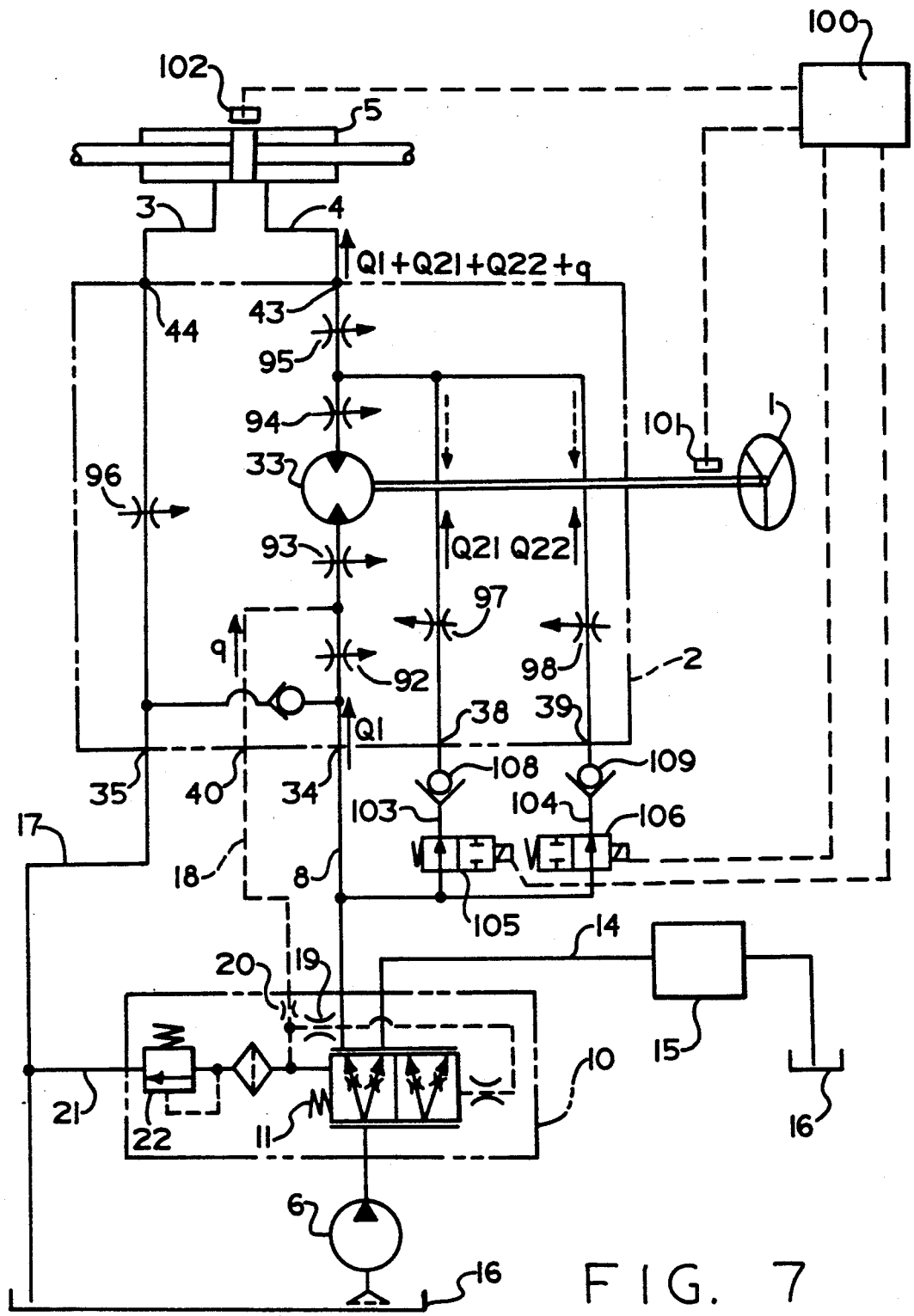
FIG. 7 is a hydraulic circuit diagram of the same embodiment when the stroke of the cylinder is short with respect to the rotation of the handle.

When the stroke of the cylinder 5 is short with respect to the amount of rotation of handle 1 (refer to FIGS. 7 and 9-(B1)), thereby correction of the stroke is required. The second auxiliary open-close valve 106 is now opened by the controller 100, so that oil flowing through the valve 106 flows to the second auxiliary inlet port 39 at the steering unit 2 through the fourth hydraulic pressure line 104. This fluid then flows through the eighth orifice 98, which is composed of the through-bore 69 at the sleeve 48 and axial groove 79 at the spool 47. Oil in excess of the usual by a flow rate of Q22 flows into the cylinder 5 to compensate for the shortage of the stroke of the cylinder 5. Accordingly, the flow rate of fluid to the cylinder at this time becomes Q1+Q21+Q22+q.

Figure 8:
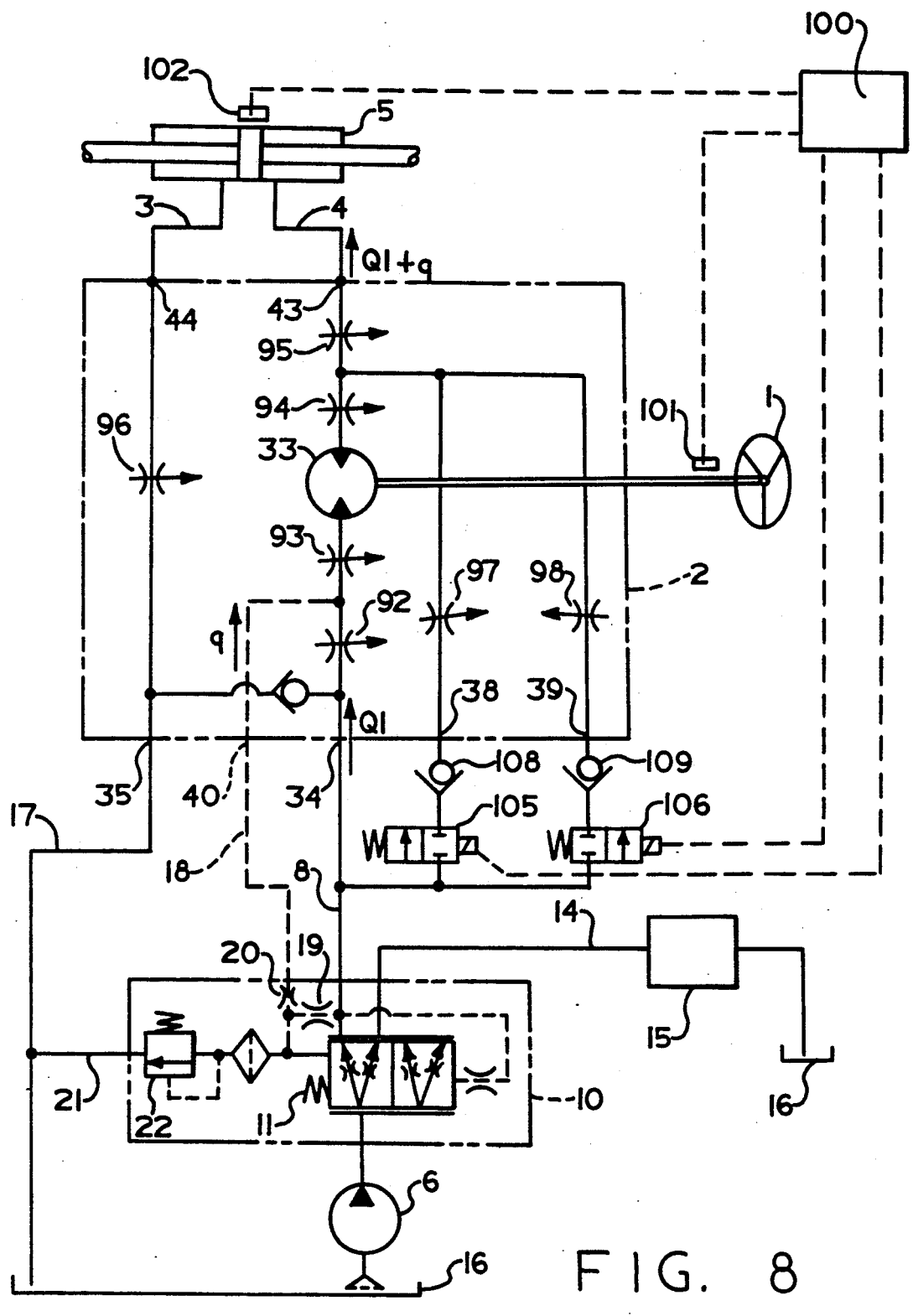
FIG. 8 is a hydraulic circuit diagram of the same embodiment when the stroke of the cylinder is over with respect to the rotation of the handle.

When the stroke of cylinder 5 exceeds the rotation of handle 1 (refer to FIG. 8 and FIG. 9 (C)), thereby correction of the stroke is required. Hence, the controller 100 closes both of the auxiliary open-close valves 105 and 106, and the feed of oil into both the auxiliary inlet ports 38 and 39 is stopped. Subtracting the flow rate Q21 and Q22 from that flowing in the system of FIG. 7, the flow rate Q1+q is established, flowing into the cylinder 5, thereby correcting the excessive stroke of the cylinder 5.

In the conditions shown in FIGS. 6 and 7, assuming that manual steering is carried out in an emergency, such as when the pump 6 stops, the oil is discharged to the right-hand port 43 from the amplified portion 33 of the steering unit 2, in an amount corresponding to torque applied to the handle 1. Because both the auxiliary open-close valves 105 and 106 are open, the discharged oil could flow back as shown by the dotted line arrow in FIG. 7, which is prevented by both the check valves 108 and 109, thereby enabling the manual steering, as is now well known in the art.

In the above-mentioned case, the relation between the torque T and the generated pressure dP, when capacity of amplified portion 33 is represented by Q, is given in the following equation:

$$T = \frac{dP \times Q}{200 \, pi}$$

The above description is for the right-hand rotation of handle 1, but for the left-hand rotation thereof, merely the direction is reversed, such that description thereof will be omitted.

In the present embodiment, flow rates Q21 and Q22 of correction flow are not affected by load pressure, or the like, of the cylinder 5, but instead, are decided by the area of each orifice 97 and 98, respectively. In the subject embodiment, the area of the orifices 97 and 98 correspond to the angular displacement between the spool 47 and the sleeve 48 following the rotation of handle 1. Accordingly, the area of each orifice is changed to enable the flow rate of correction oil to be changed, thereby enabling a proper amount of oil to be supplied. Pressure of cylinder 5 is not different from the correction pressure of the third and fourth hydraulic pressure lines 103 and 104 during the correction, and therefore, an operator is not subjected to an uncomfortable feeling, such as a shock on the vehicle body.

Even when trouble is created in the controller 100, or auxiliary open-close valves 105 and 106, because the flow rates Q21 and Q22 of correction oil are relatively small compared to main flow Q1, the steering is not so different from the normal as to be objectionable. The above-mentioned embodiment is not limited to just what is shown in the drawings and described above, but instead, may be varied. For example, stoppers for limiting the number of rotations of handle 1 may be provided at the necessary positions in order that a slip caused by leakage in the steering unit 2 at the end of the stroke does not shift the rotation of handle 1 from the detection region of the first detecting member 101. Also, the auxiliary open-close valves 105 and 106, and the check valves 108 and 109, which are illustrated as being separate from the steering unit 2, may be integral therewith, i.e., may be built into the housing 31, but are separate from the directional control valve 7.

In addition, in the controller 100 is disposed a circuit which is capable of putting both the auxiliary open-close valves 105 and 106 simultaneously open or closed. When both the auxiliary open-close valves 105 and 106 are closed, the stroke of cylinder 5 is small with respect to the rotation of handle 1, thereby improving the straight forward running efficiency. Accordingly, it is possible to perform relatively fine steering in a restricted place. On the contrary, when both the auxiliary valves 105 and 106 are open, the stroke of cylinder 5 becomes larger with respect to the rotation of handle 1, thereby enabling the work efficiency to be improved, by increasing the "gain" of the system, i.e., the amount of movement of the cylinder 5 per unit of rotation of the handle 1.

In the present invention, as was mentioned above, the conventional steering apparatus is provided at the third and fourth hydraulic pressure lines with the check valves 108 and 109, respectively, so that when the cylinder stroke is short with respect to the rotation of handle, the controller opens or closes the first and second auxiliary open-close valves 105 and 106 by the appropriate signal from the first and second detecting members 101 and 102, respectively, thereby correcting the over and short conditions. The apparatus is advantageous in that the neutral position of the cylinder 5 can be identified with the neutral position of the handle 1, and fluid may be continuously supplied during the normal steering so as to prevent idling of the handle. Even in emergency steering situations, if oil discharged from the hydraulic pressure source stops during the steering, the oil discharge corresponding to the torque of the handle 1 continues, thereby enabling the steering to be continued.

Although the valves 105 and 106 have been illustrated and described as separate valve members, in order to explain the concept, it should be apparent to those skilled in the art that a single proportional solenoid valve could be used instead.

The invention has been described in great detail in the foregoing specification, and it is believed that various alterations and modifications of the invention will become apparent to those skilled in the art from a reading and understanding of this specification. It is intended that all such alterations and modifications are included in the invention, insofar as they come within the scope of the appended claims.

I claim:

1. A full hydraulic power steering apparatus of the type including a steering unit having a directional control valve operated by an input handle; a steering cylinder which is connected with said steering unit through first hydraulic pressure lines comprising a left line and a right line, and steers a steered wheel; a hydraulic power source for supplying hydraulic pressure to said steering cylinder through said steering unit and said first hydraulic pressure lines; a second hydraulic pressure line for connecting said hydraulic power source and said steering unit; characterized by:
   (a) third and fourth hydraulic pressure lines for communicating said second hydraulic pressure line with said steering unit and including first and second auxiliary open-close valves, respectively;
   (b) first and second detection members for outputting signals corresponding to displacement from a neutral position of said input handle and a neutral position of said steering cylinder, respectively;
   (c) a controller for inputting therein the signals from said detection members to achieve opening and closing of said auxiliary open-close valves respectively; and
   (d) check valves disposed in said third and fourth hydraulic pressure lines; respectively.

2. A power steering apparatus as claimed in claim 1 characterized by said steering unit comprising an amplified portion for imparting follow-up movement to said directional control valve proportional to the volume of fluid flow through said amplified portion.

3. A power steering apparatus as claimed in claim 1 characterized by said directional control valve comprising a rotatable spool adapted to be operated by said input handle, and a cooperating, relatively rotatable sleeve.

4. A power steering apparatus as claimed in claim 1 characterized by said steering unit comprising a housing defining an inlet port connected to said second hydraulic pressure line and right-hand and left-hand ports connected to said first hydraulic pressure lines.

5. A power steering apparatus as claimed in claim 4 characterized by said third and fourth hydraulic pressure lines being disposed external to said housing of said steering unit, said housing defining first and second auxiliary inlet ports connected to said third and fourth hydraulic pressure lines, respectively.

6. A power steering apparatus as claimed in claim 5 characterized by said steering unit comprising an amplified portion disposed in series flow relationship in a main fluid path connecting said inlet port and one of said right-hand and left-hand ports, said housing and said directional control valve cooperating to define first and second amplification flow paths, including first and second variable amplification orifices communicating between said first and second auxiliary inlet ports, respectively, and said main fluid path downstream of said amplified portion.

7. A power steering apparatus as claimed in claim 1 characterized by said first and second auxiliary open-close valves comprising solenoid valves independently operable in response to electrical input signals from said controller to move between a closed position and an open position.

8. A power steering apparatus as claimed in claim 7 characterized by said controller being operable to compare said signals being outputted by said first and second detection members and to generate coarse and fine error correction signals, and electrical input signals transmitted from said controller being operable to move one of said auxiliary open-close valves to said open position when said error correction signal is fine, and being operable to move both of said auxiliary open-close valves to said open position when said error correction signal is coarse.

9. A full hydraulic power steering apparatus of the type including a steering unit having a directional control valve operated by an input handle; a steering cylinder which is connected with said steering unit through left and right hydraulic pressure lines to steer a steered wheel; a hydraulic power source for supplying hydraulic pressure to said steering cylinder through said steering unit and said left and right hydraulic pressure lines; an inlet hydraulic pressure line for connecting said hydraulic power source and said steering unit; said steering unit comprising a housing cooperating with said directional control valve to define a main fluid path connecting an inlet port to one of said left and right hydraulic pressure lines; said steering unit further comprising a fluid meter for imparting follow-up movement to said directional control valve proportional to the volume of fluid flow through said fluid meter, said fluid meter being disposed in series flow relationship in said main fluid path; characterized by:

(a) hydraulic conduit means for communicating said inlet hydraulic pressure line with an amplification port;

(b) auxiliary valve means disposed in said hydraulic conduit means and operable to control the flow therethrough in response to an input signal;

(c) detection means operable to detect a predetermined condition of said power steering apparatus and output a signal corresponding to said detected condition;

(d) a controller for receiving said signal outputted by said detection means and operable to generate said input signal for controlling said auxiliary valve means; and (e) said housing and said directional control valve cooperating to define an amplification flow path, including a variable amplification orifice communicating between said amplification port and said main fluid path, downstream of said fluid meter.

10. A power steering apparatus as claimed in claim 9 characterized by said directional control valve comprising a rotatable spool adapted to be operated by said input handle, and a cooperating, relatively rotatable sleeve.

11. A power steering apparatus as claimed in claim 10 characterized by said variable amplification orifice being defined at an interface of said spool and said sleeve, and having a variable flow area in response to said relative rotation between said spool and said sleeve.

12. A power steering apparatus as claimed in claim 9 characterized by said hydraulic conduit means being disposed external to said housing of said steering unit.

13. A power steering apparatus as claimed in claim 12 characterized by said auxiliary valve means being disposed external to said housing, and operable to control the flow therethrough in response to an electrical input signal.

14. A power steering apparatus as claimed in claim 9 characterized by said detection means comprising means operable to detect the position of said input handle, and means operable to detect the position of said steering cylinder.

15. A power steering apparatus as claimed in claim 9 further characterized by another hydraulic conduit means for communicating said inlet hydraulic pressure line with another amplification port; another auxiliary valve means disposed in said another hydraulic conduit means and operable to control the flow therethrough in response to another input signal; said controller being operable to generate said another input signal; and said housing and said directional control valve cooperating to define another amplification flow path, including another variable amplification orifice communicating between said another amplification port and said main fluid path, downstream of said fluid meter.

* * * * *